United States Patent [19]

Marcus

[11] 4,241,870
[45] Dec. 30, 1980

[54] REMOTE TRANSMITTER AND HOUSING

[75] Inventor: Konrad H. Marcus, Holland, Mich.

[73] Assignee: Prince Corporation, Holland, Mich.

[21] Appl. No.: 953,911

[22] Filed: Oct. 23, 1978

[51] Int. Cl.³ .............................................. B60R 5/00
[52] U.S. Cl. ..................................... 296/37.7; 455/99
[58] Field of Search ........................... 296/37.7, 24 R; 325/312, 111, 117

[56] References Cited

U.S. PATENT DOCUMENTS

| | | | |
|---|---|---|---|
| 3,095,108 | 6/1963 | McKenzie | 296/37.7 |
| 3,773,378 | 11/1973 | Lewis | 296/37.7 |
| 3,936,833 | 2/1976 | Bush | 343/225 |
| 4,079,987 | 3/1978 | Bumgardener | 296/37.7 |
| 4,101,159 | 7/1978 | Stewart | 296/37.7 |

FOREIGN PATENT DOCUMENTS

197806 6/1978 France .................... 296/37.7

*Primary Examiner*—John J. Love
*Assistant Examiner*—John A. Carroll
*Attorney, Agent, or Firm*—Price, Heneveld, Huizenga & Cooper

[57] ABSTRACT

A housing mounted between the visors in the headliner of a vehicle includes an access pocket for removably receiving and supplying operating power to a remote transmitter used for opening garage doors. The housing includes an opening into which the garage door transmitter fits and which includes a self-closing door once the transmitter is removed. A portable transmitter case is provided and is battery powered for providing a portable transmitter housing separate and apart from the housing mounted to the vehicle such that the transmitter can be used with different vehicles if desired. In one embodiment of the invention the housing includes an integral map light.

20 Claims, 23 Drawing Figures

REMOTE TRANSMITTER AND HOUSING

BACKGROUND OF THE INVENTION

The present invention relates to remote transmitters for use with garage door openers and particularly to housings therefor.

Electrically operated garage door openers are becoming an increasingly popular vehicle and home accessory. Their operation typically requires the use of a remote transmitter which is battery powered and which is carried in the homeowner's vehicle for transmitting electromagnetic radiation which, in turn, is received by a garage door opener receiver for controlling the garage door opening mechanism attached to the garage door. In the prior art, the garage door transmitters have consisted of an enclosure with a battery which must periodically be replaced. The unit is portable and vehicle owners typically either clip them to the vehicle's visor or in some cases they are removably mounted to the dashboard by a clip.

There exists several inconveniences with such prior art units, the first being that with the portable unit it is necessary to move the unit into an optimum position for operation of the garage door usually in the windshield area. Thus, if it is mounted on the dashboard, it must be removed from the dash and directed toward the garage door for operation. If mounted on the visor, it becomes a safety hazard in the form of a relatively hard projection at the head level of the vehicle. Further, it obstructs motion of the visor which, when moved, sometimes knocks the transmitter from the visor. Thus, such an arrangement interferes with the visor use as well as poses a safety hazard.

SUMMARY OF THE INVENTION

Applicants have discovered that the optimum location for a remote garage door opening transmitter is near the center of the windshield at the top with the transmitter antenna facing forwardly. This results since the vehicle window acts also as a window for the transmission of radio frequency (RF) energy to the receiver positioned in the garage and the position at the top center of the windshield directs the RF energy from the transmitter toward the garage toward which the vehicle is approaching. Applicants have solved the problems existing with the loose or demountably attached remote control transmitter by providing a housing integral with the vehicle's interior and permanently attached for receiving the remote garage door transmitter.

In one form of the invention, the remote housing serves as an integral housing for receiving the posts extending from the free ends of the visors for storage of the visors within the housing. In another form of the present invention, the garage door opener is removably mounted to the housing and can be positioned within a portable housing including its own power pack. In either embodiments, the vehicle's operating power from its battery supplies power to the remote transmitter so that separate batteries are not required. According to further aspects of the present invention, a portable housing is also provided so that the remote transmitter can be removed from the vehicle's housing and positioned within the portable housing containing its own battery source so that the transmitter can be used in vehicles which may not have the integral housing.

According to still further aspects of the present invention, the vehicle's housing also integrally includes map lights and switch means for actuating the lights to direct illumination into the passenger or driver's lap area.

These and other features, advantages, and objects of the present invention, together with the structure by which they are implemented can be more clearly understood by reading the following description thereof, together with the accompanying drawings in which:

DETAILED DESCRIPTION OF THE PREFERRED EMBODIMENT

Figure 1:
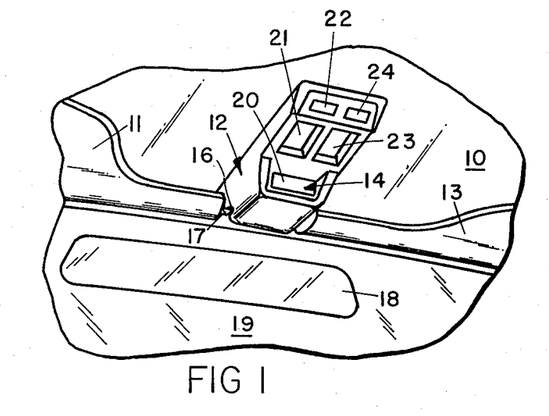
FIG. 1 is a rear perspective fragmentary view of one embodiment of the present invention.
Figure 2:
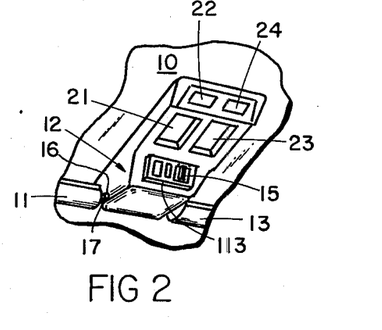
FIG. 2 is a fragmentary perspective view of the housing assembly shown in FIG. 1 with the remote transmitter in position.

Referring initially to FIGS. 1 and 2, there is shown a preferred embodiment of the invention incorporated in the headliner 10 of a vehicle such as an automobile. The invention includes a housing assembly 12 having an access door 14 communicating with a pocket for receiving a garage door opening transmitter assembly 15

Figure 9:
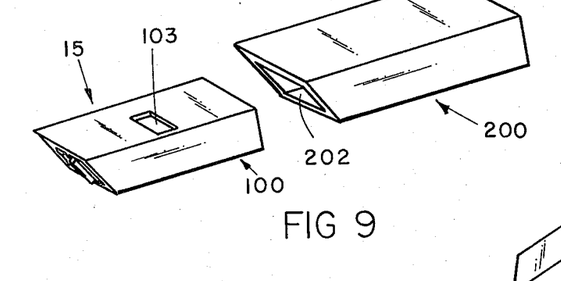
FIG. 9 is a perspective view of the remote transmitter and an associated portable housing.

(FIGS. 2 and 9). Housing assembly 12 is mounted between visors 11 and 13 and integrally includes a generally semi-circular elongated recess 16 for receiving the end posts 17 of each of the visors. Housing assembly 12 is positioned centrally above the rearview mirror 18 of the vehicle with the forward edge of the transmitter 15 directed forwardly toward the front of the vehicle for directing the radio frequency energy through the vehicle's windshield 19.

In the preferred embodiment disclosed in FIGS. 1 and 2, transmitter 15 is removable and is removed as shown in FIG. 1 such that a self-closing door 20 closes over the access opening 14 but can be pushed upwardly out of the way when the transmitting unit 15 is inserted in place as shown in FIG. 2. Also in the preferred embodiment shown in FIG. 1, housing assembly 12 integrally includes a pair of spaced map lamps 21 and 23 having push button switches 22 and 24, repectively, which are operator actuated for directing light from lamp 21 onto the driver's side of the vehicle and from lamp 23 into the passenger side of the vehicle as explained more fully below.

The housing assembly includes means also for applying operating power from the vehicle's power source to the transmitter 15 and lights 21 and 23. The transmitter assembly 15 can be permanently mounted in the housing assembly 12 if desired and the housing assembly may not include map lamps 21 and 23 as shown in the preferred embodiment. Housing 12 is particularly adapted to be mounted at the optimum location between the visors 11 and 13 with the transmitting antenna of the transmitter 15 directed forwardly to direct the radiated energy through windshield 19. It is convenient also for the housing 12 to include the visor post receiving recess 16 such that no separate bracket is required. Advantageously, however, the transmitting assembly 15 can be removed to be used in other vehicles by use of the portable transmitting housing as shown and described below in conjunction with FIGS. 9 and 10. Having briefly described the overall construction of the housing and transmitter, a detailed description of the housing assembly 12 is now presented in conjunction with FIGS. 3 through 8. In reference to the drawings, the terms top, bottom, forward, and rear are used with respect to the orientation of the invention in the vehicle. Thus, for example, switches 22 and 24 (FIGS. 1 and 2) are located at the rear of the housing assembly.

Figure 3:
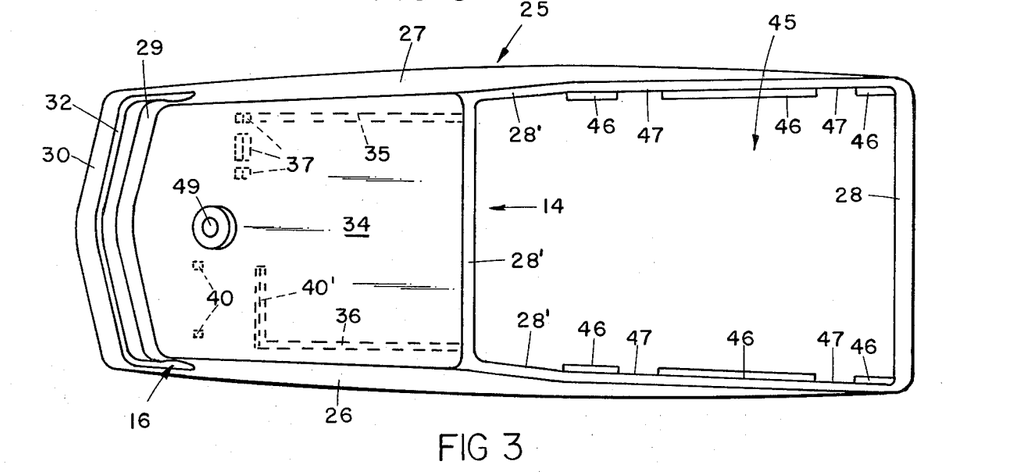
FIG. 3 is a bottom plan view of the housing shown in FIG. 1.
Figure 4:
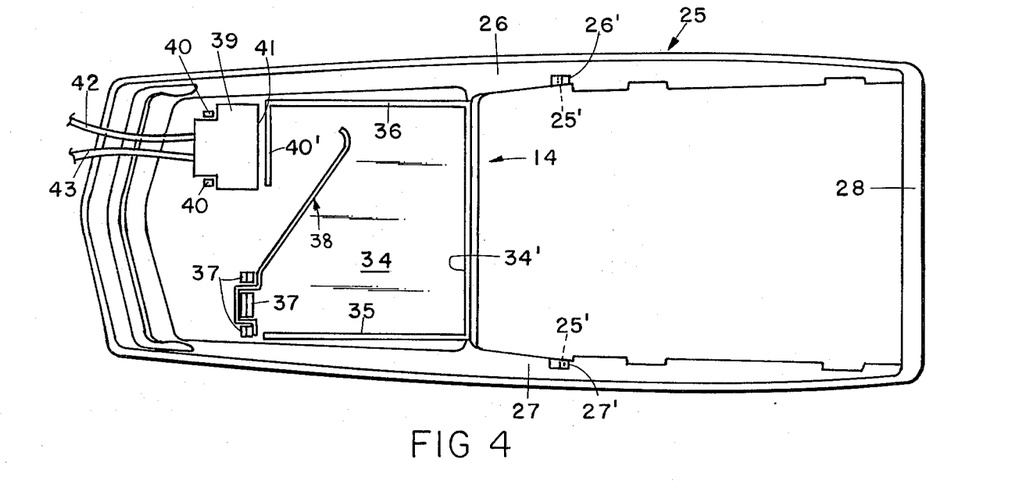
FIG. 4 is a top plan view of the housing shown in FIG. 3.
Figure 5:
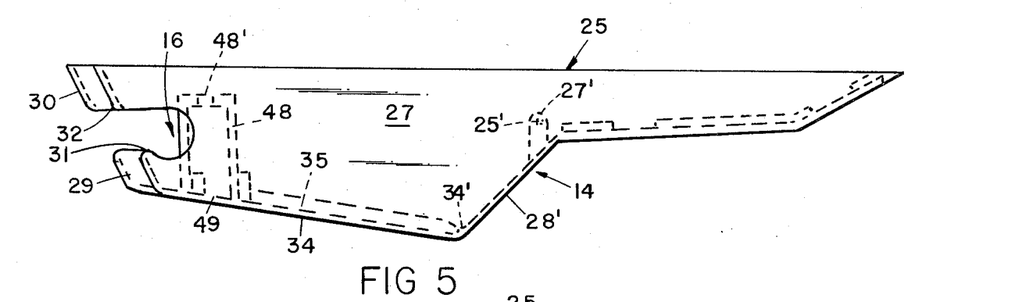
FIG. 5 is a left side elevational view of the housing shown in FIGS. 3 and 4.
Figure 6:
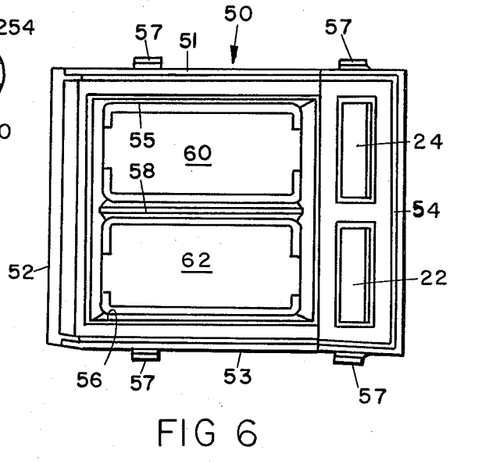
FIG. 6 is a bottom plan view of the light assembly insert for the housing shown in FIGS. 3 through 5.
Figures 7, 8:
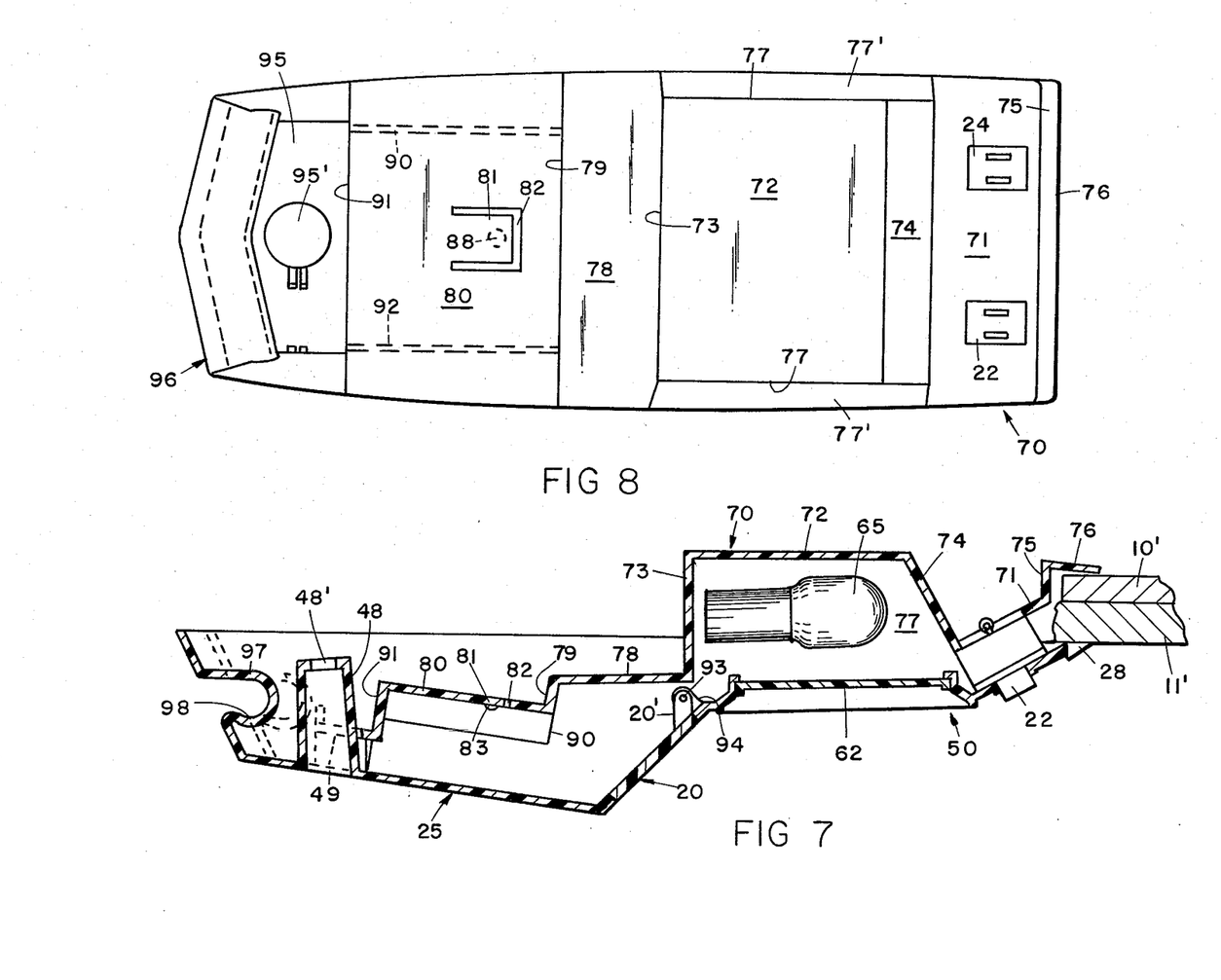
FIG. 7 is a longitudinal cross-sectional view of the housing assembly.
FIG. 8 is a top plan view of the base shown also in FIG. 7.

The housing assembly 12 of the preferred embodiment comprises three basic elements, a housing 25 shown in FIGS. 3 through 5, a lens and switch subassembly 50 shown in FIG. 6, and a base plate 70 (FIG. 8) to which the housing 25 is mounted as best seen in FIG. 7. Housing 25 includes left and right sidewalls 26 and 27 joined at the rear edge by a relatively narrow top wall 28 and along the front edge by a vertically segmented wall comprising a lower segment 29 and an upper segment 30 between which there is defined the slot or recess 16 for receiving the end posts 17 of the visors as seen in FIG. 1. Slot 16 comprises an inwardly rearwardly directed generally cylindrical recess formed partly by the base 70. The recess is defined by two halves extending inwardly from each of the sidewalls 26 and 27 to the center location along the centerline of housing 25. This is to accommodate the angle of incidence of the end posts from the two visors. As best seen in FIG. 5, the lower edge 29 of the recess includes an upwardly turned edge 31 which tends to lock the posts in position within the recess. Further, the lower surface 32 of the upper wall 30 presses downwardly against the post urging the post in a locked position within the recess. Extending between sidewalls 26 and 27 is a forward bottom surface 34 defining the floor support for the transmitter and including a pair of longitudinally and upwardly extending spaced internal support rails 35 and 36 on which the bottom of the transmitter assembly 15 rests when installed through the access opening 14. Floor 34 also supports a plurality of spaced posts 37 (FIG. 4) which project upwardly from the floor and are in spaced relationship for receiving a bias spring 38 which tends to urge and expel the transmitter assembly 15 from the transmitter holding pocket thus providing pop-out action for the unit. An electrical connector comprising a socket 39 is also mounted to the floor 34 by means of a pair of spaced posts 40 extending behind the T-shaped socket 39 which has apertures in its rearwardly extending end 41 for receiving a mating connector plug associated with the transmitter assembly 15. A pair of electrical conductors 42 and 43 extend from socket 39 and are coupled to the vehicle's power supply; namely, the battery. Wires 42 and 43 also are electrically coupled to switches 22 and 24 associated with the map light assembly of the preferred embodiment.

Extending forwardly of floor 34 and between sidewalls 26 and 27 is an opening 45 for receiving the lamp and switch assembly 50. Sidewalls 26 and 27 include inwardly directed ledges 46 defining notches 47 therebetween for receiving locking tabs 57 (FIG. 6) on the lamp and switch assembly. Housing 25 further includes a mounting boss 48 extending upwardly from floor 34 and having an opening 49 therein for receiving a fastening bolt 49' securing the housing and base to the headliner of a vehicle through an aperture 48' at the upper end of the boss.

Housing 25 is integrally molded and is configurated to smoothly fit the contour of the headliner 10 by providing tapered sidewalls 27 and the inclined floor 34 to present the rearwardly facing access opening 14 for the transmitter unit. Floor 34 includes a laterally extending lip 34' extending upwardly from the inside of the floor between rails 35 and 36 to define a stop which cooperates with a latch associated with the transmitter unit for lockably holding the transmitter into position within the pocket defined in part by the housing 25 and the base plate 70 as described more fully below. Thus, with the transmitter 15 positioned within the housing 25, spring 38 will be deflected rearwardly against half wall segment 40' extending upwardly from the floor but below plug 39 and the transmitter housing will substantially fill the space rearwardly of wall 40' and over rails 35 and 36 with the face of the transmitter unit 15 as best seen in FIG. 2 substantially co-planar with the inclined edges 28' of the housing.

Extending upwardly along the sides of access opening 14 within housing 25 on the inside of edges 28' are a pair of hinge receiving bosses 26' and 27' each having an aperture 25' therethrough for receiving a hinge pin 93 (FIG. 7) associated with door 20 (FIGS. 1 and 7).

Referring now to FIGS. 6 and 7, the lamp and switch subassembly 50 is disclosed and comprises a generally rectangular frame having sidewalls 51 and 53, end walls 52 and 54 with inclined end wall 54 including rectangular openings for switches 22 and 24. The subassembly includes a pair of lens receiving apertures 55 and 56 on opposite sides of a center rib 58 for receiving lenses 60 and 62. Positioned above the lenses, as best seen in FIG. 7, is a pair of lights 65 each positioned above one of the lenses 60 and 62 for directing light downwardly through the lenses which in turn direct light to the side of the centerline of the vehicle toward the lap of the vehicle operator or a passenger, respectively. As noted above, the electrical conductors 42 and 43 are coupled to the lamps 65 through the switches 22 and 24 in a conventional manner. Switches 22 and 24 are mounted on an upwardly inclined surface 71 of base plate 70 as best seen in FIG. 7. The base plate 70 is fitted downwardly over the housing 25 as seen in FIG. 7 and includes a lamp enclosure defined by a floor 72, a front vertically extending wall 73, and a rear inclined wall 74 which can be coated with a reflective material for directing illumination from the lamps downwardly through the lenses. An aperture is provided in wall 71 for receiving the switches which are suitably secured therein. A rear vertical wall 75 terminates in a rearwardly projecting lip 76 which fits under the headliner 10' of the vehicle. The upholstery 11' fits under the headliner and between the forwardly projecting edge 28 of housing 25. Surface 72 of the base 70 naturally is spaced slightly below the roof of the vehicle. Sidewalls 77 extend downwardly from wall 72 and join to edges 77' of the base. Wall 73 joins horizontal floor 78 which communicates with an inclined wall 79 which, in turn, is coupled to an upwardly inclined wall 80.

Wall 80 integrally includes a spring member defined by a U-shaped slot 82 as best seen in FIG. 8 forming a cantilevered arm 81 with a dimple 82 projecting downwardly to engage the top surface of the transmitter assembly urging the transmitter assembly against the guide rails 35 and 36 of housing 25. Wall 80 further includes a pair of downwardly vertically and longitudinally extending sidewalls 90 and 92 providing lateral support for the transmitter assembly 15 and a rear wall 91 against which the transmitter extends when in a fully inserted position. Thus, base 70 and housing 25 define a pocket for guidably supporting and holding the transmitter assembly in position within the unit as shown in FIG. 2. Base 70 further includes a generally horizontally inclined wall 95 extending forwardly and terminating in a C-shaped member 96 corresponding to the shape of recess 16 for mating with recess 16 of housing 25. It is noted here that member 96 is continuous and defined by upper and lower walls 97 and 98 with the upper wall 97 urging the post 17 of the visors downwardly into the notch defined in part by edges 31 of housing 25 and the lip on lower wall segment 98 of the member 96. Wall 95 includes an aperture 95' for permitting a fastening bolt to extend therethrough and for fitting over boss 48 of housing 25. Aperture 48' in boss 48 permits such fastening bolt to extend upwardly to a nut (not shown) welded to the roof of the vehicle for securing the assembly near the windshield.

Figure 10:
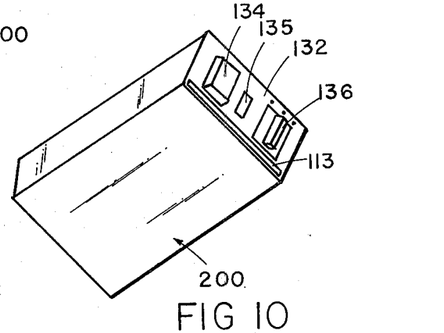
FIG. 10 shows the structure of FIG. 9 with the transmitter inserted in the housing.

Door 20 is a generally rectangular member and includes a laterally extending hinge boss 20' (FIG. 7) for receiving a hinge pin 93 with a coil spring 94 urging the door in the closed position illustrated in FIG. 7. Spring 94 permits the door to be relatively easily swung to an open position providing access to the interior pocket defined by the walls 90, 91, and 92 of the base and guide rails 35 and 36 of the housing. Having described the housing assembly 12 and its constituent elements, a description of the transmitter unit 15 which fits within housing 12 or within a portable housing 200 as seen in FIGS. 9 and 10 is now described in conjunction with FIGS. 11 through 16.

Figure 11:
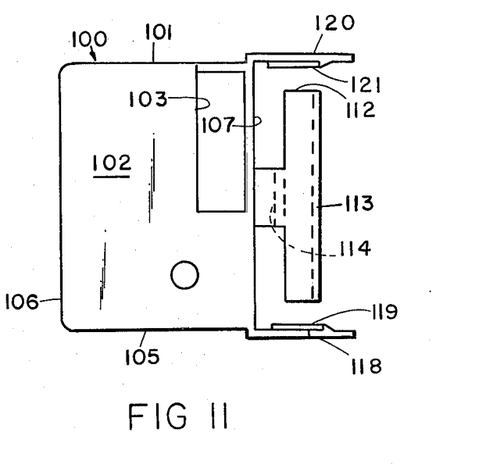
FIG. 11 is a top plan view of the transmitter case.
Figure 12:
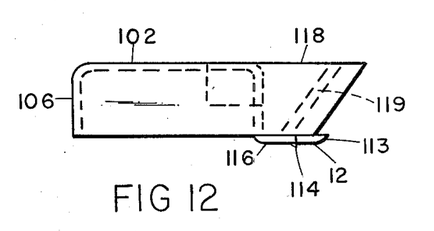
FIG. 12 is a left side elevational view of the transmitter case.
Figure 13:
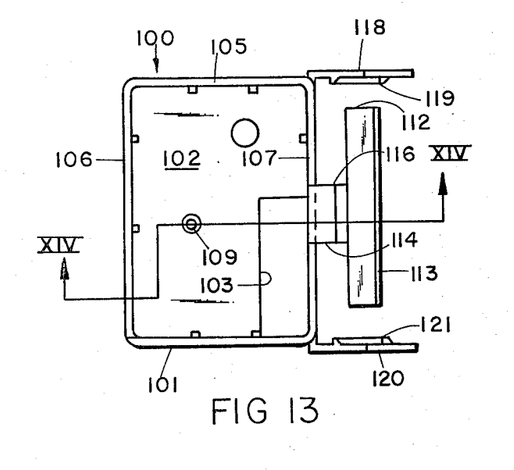
FIG. 13 is a bottom plan view of the transmitter case.
Figure 14:
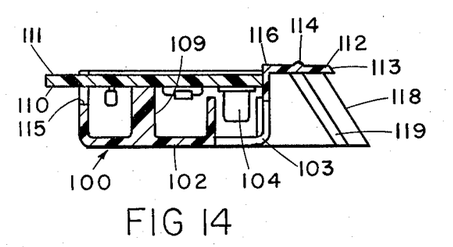
FIG. 14 is a cross section of the transmitter case with the circuit board mounted thereto and taken along section lines XIV—XIV of FIG. 13.

The transmitter assembly 15 comprises a molded case as seen in FIGS. 11 through 13 which supports a first circuit board 110 (FIG. 14) containing the radio transmitter and a second circuit board 135 (FIG. 15) containing the front panel electronics. Case 100 has a top wall 102 with a rectangular window 103 permitting access to digital thumbwheel code switches 104 (FIG. 14) mounted on circuit board 110. Circuit board 110 is mounted within the case 100 by means of a mounting boss 109 extending upwardly from surface 102 and a suitable screw which extends through the circuit board into an aperture (not shown) within boss 109. Top wall 102 is supported by left and right sidewalls 101 and 105, a front wall 106, and a rear vertically extending wall 107. Extending along the lower edge of wall 107 rearwardly is a T-shaped lever joined to wall 107 by cantilevered arm 116. A downwardly extending lip 114 is integral with arm 116 which, as best seen in FIGS. 12 and 14, defines latch means which cooperate with stop 34' (FIG. 5) of housing 25 to hold the transmitter assembly into position within the transmitter receiving pocket of the housing assembly. The reduced cross area section 116 provides a flexible latch with the front edge 113 being raised by the operator to disengage members 114 and 34' for releasing the transmitter.

Front wall 106 of case 100 includes a slot 115 permitting a plug connector 111 of board 110 to extend therethrough and cooperatively mate and engage with contacts 41 in socket 39 mounted to the housing as seen in FIG. 4. Thus, with the transmitter slid into position, contacts on plug 111 engage the contacts in socket 39 to provide operating power to the radio transmitter.

Figure 15:
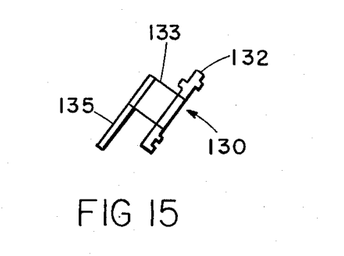
FIG. 15 is a left side elevational view of the front panel insert for the transmitter assembly.
Figure 16:
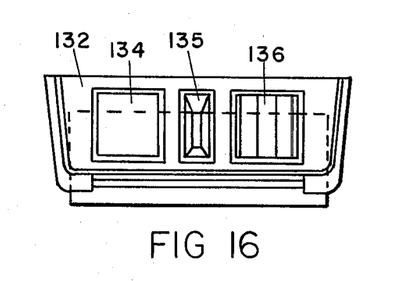
FIG. 16 is a front elevational view of the transmitter.

Case 100 includes a pair of rearwardly projecting legs 118 and 120 with inwardly directed slides 119 and 121, respectively, for receiving a bezel control panel subassembly 130 for the transmitter as shown in FIGS. 15 and 16. Bezel subassembly 130 includes a front panel 132 for receiving a garage door opening switch 134 (FIG. 16), a lens 135 behind which there is positioned a light emitting diode (LED) indicating when the garage door transmitter is being actuated and a three position switch 136 for selecting one of three different codes to be transmitted for opening three different doors or three different appliances or devices with which the transmitter is being employed. The front panel 132 includes a mounting boss 133 for coupling a circuit board 135 thereto. Board 135 supports switch 134, the LED associated with lens 135, and the associated circuitry. Suitable electrical conductors (not shown) couple circuit board 135 with circuit board 110 to complete the electrical circuit forming the transmitter. The circuit boards and the electronics associated therewith of the transmitter can be of the type disclosed in U.S. Pat. No. Re. 29,525, reissued on Jan. 24, 1978, to Willmott and assigned to Chamberlain Manufacturing Corporation, the disclosure of which is incorporated herein by reference. Circuit board 135 extends laterally a distance sufficient to fit within slots 119 and 120 for mounting the front panel to the case 100 to form the integral assembly. The molded construction of the housing 25, insert 50, and backing plate 70, as well as case 100, is of a suitable polymeric material with sufficient resiliency for the bias means 116 and 81 to act in cooperation for lockably securing the transmitter in place. In the preferred embodiment, polycarbonate was employed which can be colored to match the interior of a particular vehicle on which the unit is installed.

As noted earlier, transmitter 15 can be removed from housing assembly 12 as shown in FIG. 1 and positioned in a portable transmitter housing 200 as seen in FIG. 10. This permits the owner of the vehicle to use the transmitter with vehicles other than those which may include an integral housing 12. For such purpose, a portable transmitter housing 200 is provided which includes an opening 202 for receiving the transmitter assembly 15. The transmitter housing 200 is shown in greater detail in FIGS. 17 and 18 and is divided into a first compartment 203 for receiving the transmitting unit and a second compartment 204 for retaining a battery 206 and a plug 239 of identical construction to plug 39 mounted in housing 25 (FIG. 4). Housing 200 includes a floor 208, a top 210, sidewalls 212 and 214, and a front wall 216 with an access door 218 of conventional design for gaining access to the battery 206 for replacement. A spring 238, identical to spring 38 shown in FIG. 5, is employed to pop out the transmitter unit 15 while a stop 234' identical to stop 34' is used to engage the latch 114 on the transmitter holding it in position within housing 200 for use. Sidewalls 212 and 214 provide lateral support for the transmitter when positioned within the housing while the upper and lower floors provide alignment for the transmitter such that plug 111 on circuit board 110 (FIG. 14) aligns with socket 239 once the transmitter assembly is inserted into the portable unit 200. Unit 200 thus provides portable power and a protective compartment for the transmitter such that it can be used apart from the vehicle including the permanent housing 25.

Figure 19:
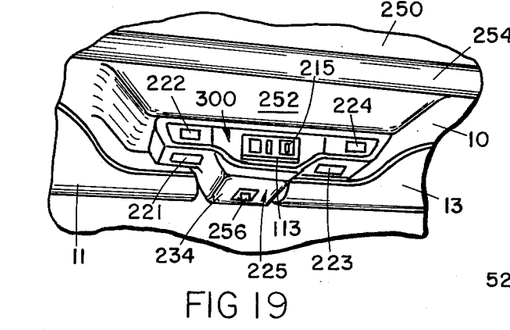
FIG. 19 is a perspective view of an alternative embodiment of the present invention.

Another embodiment of the present invention for use with vehicles having a sunroof is shown in FIG. 19. In this figure, the headliner 10 of the vehicle includes a sliding sunroof 250 which is actuated by a motor contained within a downwardly projecting motor housing 252. A seal and upholstery cover 254 extends around the edges of the sunroof. In the embodiment of the invention shown in FIG. 19, a housing 225 containing a transmitter assembly 15 is constructed with the central portion of the housing 225 being substantially identical to housing 25 to define a pocket with a bias spring and latch arrangement identical to that described in conjunction with the first embodiment. Housing 225, however, has a pair of map lamps 221 and 223 mounted laterally of the central portion of the housing instead of rearwardly as described in connection with the embodiment shown in FIG. 1. Lamp 221 is actuated by switch 222 and includes a lens for directing light onto the lap of the driver while lamp 223 is actuated by a switch 224 and includes a lens for directing light onto the lap of the passenger. The sunroof version of the present invention also includes a lower surface 234 which has an aperture for receiving an electrical switch 256 for actuating the motor associated with the electrically operated sunroof. Further, the trailing edge of the housing assembly 225 is particularly adapted to receive a mechanical crank which can be employed in the event of motor failure for any number of reasons and it is desired to open or close the sunroof manually. For such purpose, a crank closure door assembly 300 is provided.

Figures 17, 20, 21:
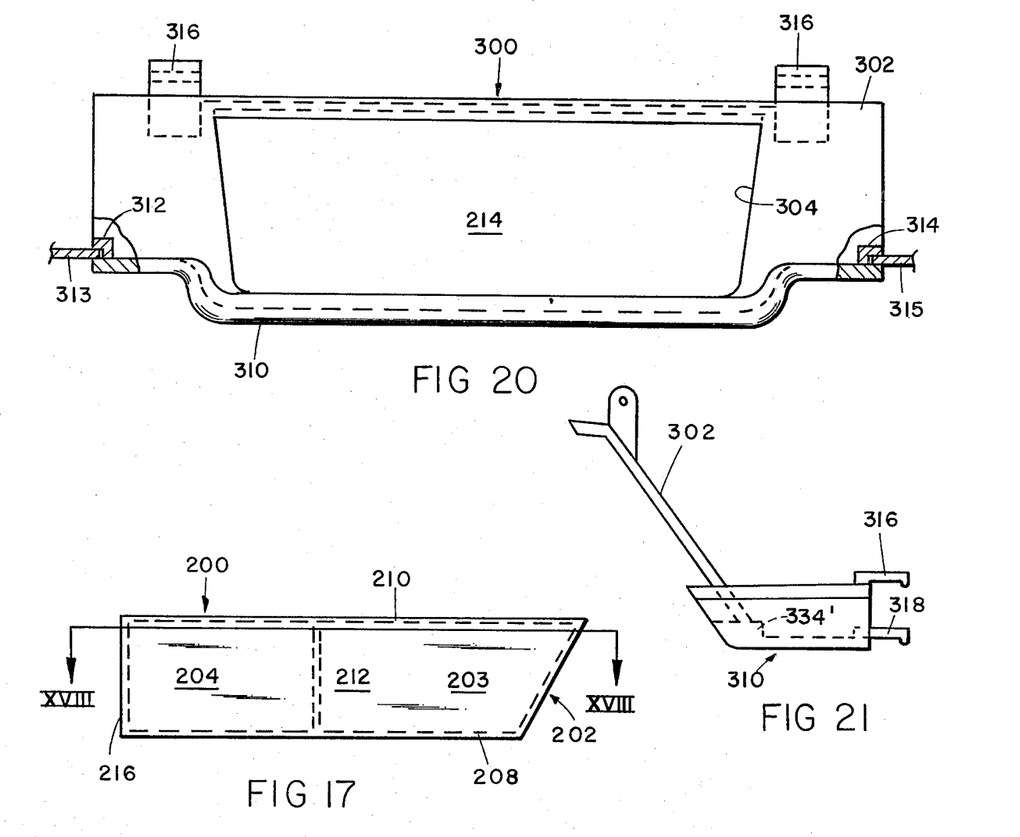
FIG. 17 is a side elevational view of the portable transmitter housing shown also in FIG. 9.
FIG. 20 is a fragmentary front elevational view of a portion of the structure shown in FIG. 19.
FIG. 21 is a right side elevational view of the structure shown in FIG. 20.
Figure 18:
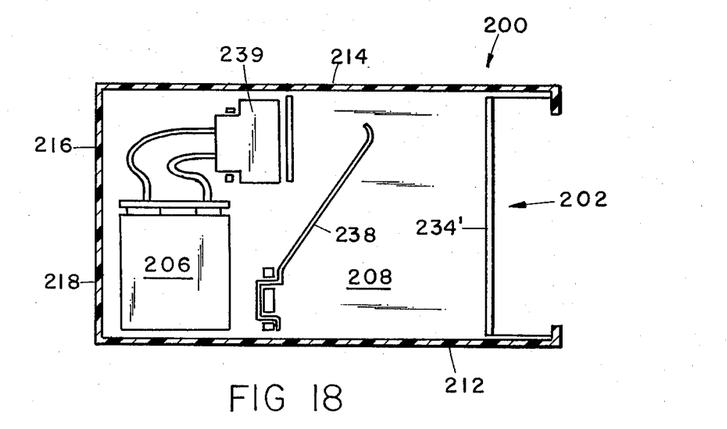
FIG. 18 is a cross-sectional view of the portable transmitter housing taken along section lines XVIII—XVIII of FIG. 17.

Referring to FIGS. 20 and 21, the crank access door assembly 300 includes a generally rectangular door panel 302, provided with a rectangular opening 304 receiving a door 214 substantially identical to door 14 shown in FIG. 1, and pivotally mounted to be self-closing for aperture 304. Aperture 304 thus provides access to the transmitter receiving and holding pocket of the housing 225. Member 302 includes a lower forwardly extending slide 310 which integrally includes an upwardly projecting lip 334' providing a stop for cooperating with the transmitter latch 114 in the same manner as latch means 34' and 114 operate in conjunction with the first embodiment of the invention. Slide assembly 310 includes L-shaped brackets 312 and 314 which engage guide rails 313 and 315, respectively, mounted to the interior of the housing 225 for slidably receiving assembly 300. Vertically and horizontally spaced L-shaped forwardly projecting latch members 316 and 318 latch the unit into position in a releasable fashion such that the closure member 300 can be removed from the housing assembly 225 providing a relatively enlarged opening port which communicates with the end of a crank arm for the sunroof. Thus, with the embodiment shown in FIGS. 19 through 21, the system of the present invention can be conveniently used with a vehicle with an electrically powered sunroof.

Figure 22:
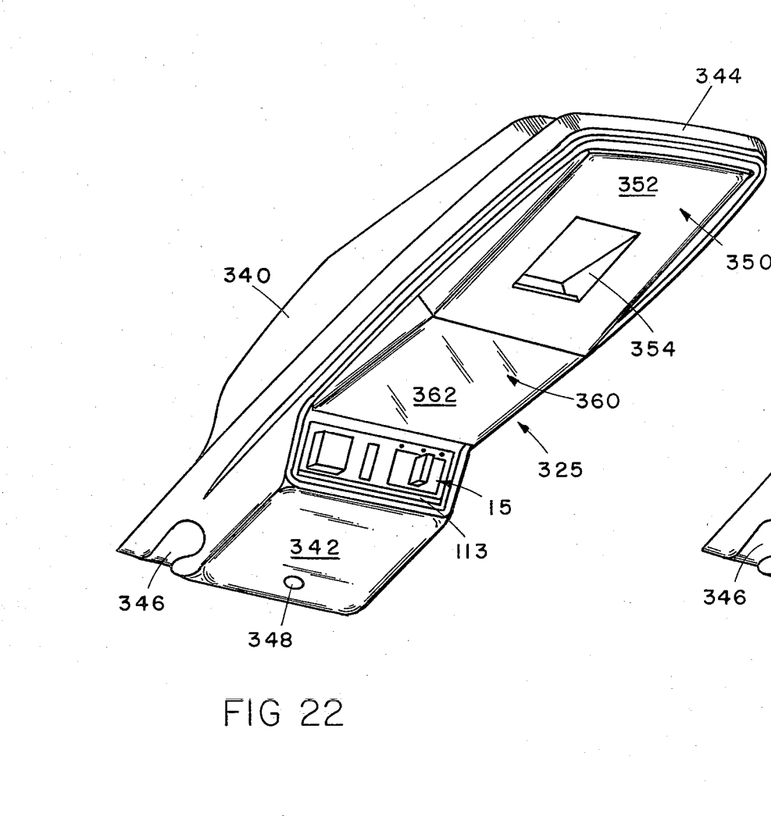
FIG. 22 is a perspective view of another embodiment of the invention.
Figure 23:
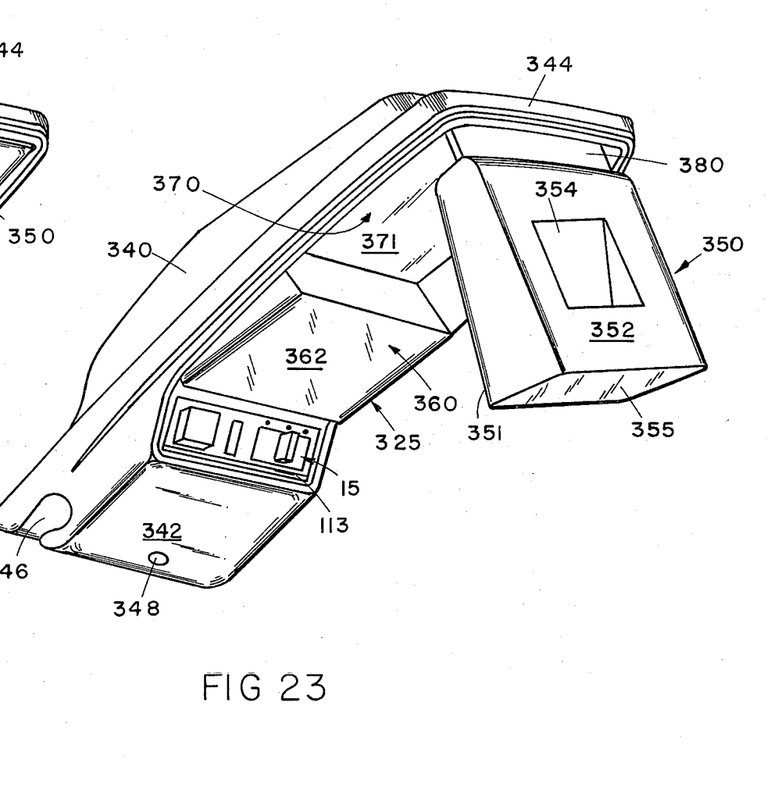
FIG. 23 is a perspective view of the structure shown in FIG. 22 with the directable light shown in the operative position.

Another embodiment of the invention is shown in FIGS. 22 and 23. The housing includes sidewalls 340, a bottom wall 342, and a rear wall 344. Housing 325 also includes forwardly projecting recess means 346 for receiving the posts of the vehicle's visors. An aperture 348 extends through the housing for mounting it to the vehicle in the same position as the embodiments shown in FIGS. 1 and 19. A pocket with an access door is provided for receiving a transmitting unit 15 and is defined in part by floor 342 and sidewalls 340. The rear portion of the housing includes a directable map light assembly 350.

Positioned between assembly 350 and the transmitter receiving section is an overhead light 360 including a lens 362 for focusing the light generally centrally within the vehicle by means of a light positioned behind the lens. The directable light assembly 350 is shown in its stored position in FIG. 22 with a recess 370 (FIG. 23) and includes a light enclosure having bottom surface 352 with a recess 354 for lowering the light into an operative position as shown in FIG. 23. Housing 350 includes an internal lamp and a lens 355 focusing light in a direction outwardly from the lens. The light is automatically actuated when withdrawn from recess 370 by a pressure switch positioned between the floor 371 of the recess and the top surface 351 of enclosure 350.

Enclosure 350 is pivotally mounted to wall 344 by a pivot pin at an end of a coupling bracket 380 joining enclosure 350 to housing 325. The opposite end (the lower end in FIG. 23) of bracket 380 is pivotally mounted to housing 350 to permit the light from lens 355 to be directed from side to side in the vehicle as well as fore and aft. When not in use, the pivoted lamp assembly 350 is returned to the position shown in FIG. 22. As with the previous embodiments, the transmitter 15 may be removed from the pocket of the housing in which case, a door encloses the access opening of the transmitter receiving pocket.

It will become apparent to those skilled in the art that various modifications to the preferred embodiments of the invention disclosed and described herein can be made without departing from the spirit or scope of the present invention as defined by the appended claims.

The embodiments of the invention in which an exclusive property or privilege is claimed are defined as follows:

1. A housing adapted to be mounted in a vehicle headliner for removably securing a garage door opening radio frequency transmitter to the vehicle in an operator accessible location comprising:

housing means including an access opening and guide and support means positioned in said housing in relation to said access opening for releasably supporting an electronic transmitter such that the vehicle user can easily insert or remove a radio transmitter therein, said housing means including means for attaching said housing to the headliner of a vehicle to position a radio frequency transmitter including a self-contained antenna in a position to operate remotely controlled devices, said housing further including means for supplying electrical power to the transmitter from the vehicle's power source.

2. A housing adapted to be mounted in a vehicle headliner for removably securing a garage door opening radio frequency transmitter to the vehicle in an operator accessible location comprising:

housing means including a pocket for removably receiving a transmitter and further including a transmitter shaped to fit within said pocket such that the vehicle user can easily insert or remove a transmitter therein, said housing means including means for attaching said housing to the headliner of a vehicle to position a radio frequency transmitter including a self-contained antenna in a position to operate remotely controlled devices, said housing further including means for supplying electrical power to the transmitter from the vehicle's power source and wherein said housing includes an access opening communicating with said pocket and self-closing door covering said access opening when said transmitter is not within said housing.

3. The apparatus as defined in claim 2 wherein said transmitter includes a control panel and said control panel is operator accessible when said transmitter is inserted into said pocket.

4. The apparatus as defined in claim 3 wherein said housing includes bias means for urging said transmitter outwardly from said housing and wherein said transmitter includes movable latch means and said housing includes a stop cooperating with said latch means for releasably holding said transmitter within said housing.

5. The apparatus as defined in claim 4 wherein said housing further includes map light means for selectively directing illumination toward the driver or passenger side of the vehicle.

6. The apparatus as defined in claim 5 and further including a portable housing for removably receiving said transmitter, said portable housing including a self-contained power source for supplying operating power to said transmitter.

7. The apparatus as defined in claim 6 wherein said means for supplying operating power to said transmitter comprises a first electrical connector mounted to said housing, a second electrical connector mounted on said transmitter when said transmitter is positioned within said pocket and means for coupling said first electrical connector to the vehicle power source.

8. For use in a vehicle, a radio frequency transmitter storage and power supply system for actuating a remote device comprising:

a housing including an access opening and guide and support means positioned in said housing in relation to said access opening for releasably supporting a portable radio frequency transmitter, said housing including means for supplying electrical power to said transmitter from the vehicle power source, said housing shaped to be mounted to the headliner of a vehicle;

a portable radio frequency transmitter insertable by the vehicle user into said housing for receiving power therefrom; and means for mounting said housing to a vehicle such that the radio frequency transmitter is in a position to operate remotely controlled devices.

9. For use in a vehicle, a radio frequency transmitter storage and power supply system for actuating a remote device comprising:

a housing for removably supporting a portable radio frequency transmitter, said housing including means for supplying electrical power to said transmitter from the vehicle power source, said housing shaped to be mounted to the headliner of a vehicle;

a portable radio frequency transmitter insertable by the vehicle user into said housing for receiving power therefrom; and means for mounting said housing to a vehicle such that the radio frequency transmitter is in a position to operate remotely controlled devices and wherein said housing includes a pocket for receiving said transmitter, an opening communicating with said pocket, and a self-closing door closing said opening when said transmitter is removed from said pocket.

10. The system as defined in claim 9 wherein said housing includes bias means urging said transmitter from said pocket through said opening and a stop, and wherein said transmitter includes releasable latch means cooperating with said stop to releasably hold said transmitter within said pocket.

11. The system as defined in claim 10 wherein said means for supplying operating power to said transmitter comprises a first electrical connector mounted to said housing, a second electrical connector mounted on said transmitter when said transmitter is positioned within said pocket and means for coupling said first electrical connector to the vehicle power source.

12. The system as defined in claim 11 and further including a portable housing for removably receiving said radio frequency transmitter, said portable housing including a self-contained power source for supplying operating power to said transmitter.

13. A housing adapted to be mounted to the headliner of a vehicle for receiving a remote control transmitter comprising:

housing means having an aperture and guide and support means positioned in said housing in relation to said aperture for permitting the vehicle user to readily insert or remove an electronic transmitter therein, said housing means including means for attaching said housing to the headliner of a vehicle between the visors, said housing further including means for supplying electrical power to a transmitter unit.

14. The housing as defined in claim 13 wherein said housing includes recess means for releasably holding the end posts of the visors.

15. The housing as defined in claim 14 and further including a pair of spaced map lights and means for individually actuating said lights to selectively direct illumination therefrom toward the passenger or driver's side of the vehicle.

16. A housing assembly for use in storing a garage door opening transmitter for a vehicle comprising:

housing means including means for mounting said housing to the headliner of a vehicle between the visors thereof, said housing including a recess defined by an access opening and guide and support means for releasably supporting a transmitter assembly which can be readily inserted or removed by the vehicle user, and means for supplying power to said housing for application to said transmitter means.

17. A housing assembly for removably storing a remote control transmitter in a vehicle, said housing comprising:

housing means including a pocket defined by an access opening and guide and support means for releasably receiving an electronic transmitting unit, said housing means including means for mounting said housing to the headliner of a vehicle between the visors of a vehicle adjacent the windshield area of the vehicle; and transmitter means having a self-contained antenna and adapted to fit within said pocket for operating devices which can be remotely controlled by said transmitter means.

18. The apparatus as defined in claim 17 wherein said housing and transmitter further include means for supplying operating power to said transmitter from the vehicle power source.

19. The apparatus as defined in claim 18 wherein said housing further includes recess means for receiving end posts of the visors.

20. The apparatus as defined in claim 19 wherein said housing further includes map light means for selectively directing illumination toward the driver or passenger side of the vehicle.

* * * * *